(12) United States Patent
Hashimoto et al.

(10) Patent No.: US 6,427,989 B1
(45) Date of Patent: Aug. 6, 2002

(54) VIBRATION-ISOLATING APPARATUS (75) Inventors: Tsutomu Hashimoto; Yukio Takashima, both of Osaka (JP)

(73) Assignee: Toyo Tire & Rubber Co., Osaka (JP)

( * ) Notice: Subject to any disclaimer, the term of this patent is extended or adjusted under 35 U.S.C. 154(b) by 0 days.

(21) Appl. No.: 09/538,308

(22) Filed: Mar. 30, 2000

(30) Foreign Application Priority Data

Jul. 21, 1999 (JP) .......................................... 11-205534
Mar. 23, 2000 (JP) ...................................... 2000-083008

(51) Int. Cl.$^7$ ............................................... F16M 1/00
(52) U.S. Cl. ................................................. 267/141.04
(58) Field of Search ........................... 267/140.1–141.7, 267/35, 219, 220, 140, 153, 152, 279, 280; 248/562, 573, 606, 607, 636, 659; 180/300, 312, 902

(56) References Cited

U.S. PATENT DOCUMENTS

| | | | |
|---|---|---|---|
| 3,101,228 A | * 8/1963 | Olowinski | ............... 267/140.4 |
| 4,842,258 A | * 6/1989 | Misaka | .................... 267/140.5 |
| 5,215,293 A | 6/1993 | Muramatsu et al. | |
| 5,217,211 A | 6/1993 | Ide et al. | |
| 5,246,212 A | 9/1993 | Funahashi et al. | |
| 5,314,173 A | 5/1994 | Ide et al. | |
| 5,620,168 A | 4/1997 | Ohtake et al. | |
| 5,628,498 A | 5/1997 | Nanno | |
| 5,632,472 A | 5/1997 | Kato et al. | |
| 5,642,873 A | 7/1997 | Kato | |

FOREIGN PATENT DOCUMENTS

JP 10047423 2/1998

* cited by examiner

Primary Examiner—Christopher P. Schwartz
Assistant Examiner—C. T. Bartz
(74) Attorney, Agent, or Firm—Jordan and Hamburg LLP (57) ABSTRACT It is aimed to simplify assembling of an insert metal fitting into a liquid-filled Vibration-isolating apparatus and to avoid products defection. A vibration-isolating apparatus comprises upper and lower metal fittings 2, 3; a vibration-isolating base body 4 connecting the upper and lower metal fittings 2, 3 and formed of an elastic material having rubber-like elasticity; and an insert metal fitting 8 embedded in the vibration-isolating base body 4; the insert metal fitting 8 being formed of a metal plate or sheet bent in an approximately U-shape. The insert metal fitting 8 including a pair of flat side-plate portions 32; and a connecting portion 31 connecting the upper ends of the side-plate portions 32. The connecting portion 31 is clamped between the upper metal fitting 2 and a screw head 9a of the mounting bolt 9 which bolt is upwardly inserted into the through hole from vibration-isolating base-body side of the connecting portion. Thus, the mounting of the insert metal fitting is simplified; coating of inner surface of the insert metal fitting 8 with adhesive is facilitated. Moreover, the flow-in property of rubber into the opening of the insert metal fitting 8 is improved.

11 Claims, 5 Drawing Sheets

VIBRATION-ISOLATING APPARATUS

BACKGROUND OF THE INVENTION

1. Field of the Invention

This invention relates to a vibration-isolating apparatus for supporting a vibration-generating body, mainly used for supporting an engine of an automobile or the like.

2. Description of the Related Art

Following vibration-isolating apparatuss are known as an engine mount or the like, which supports a vibration generating body such as an engine of an automobile while preventing the transmission of the vibration of the vibration-generating body to a vehicle body. One of the known vibration-isolating apparatuses comprises an upper metal fitting having a mounting bolt which is mounted on a vibration-generating-body side; a lower metal fitting having bolts which are mounted on a vehicle-body side; and a vibration-isolating base body connecting the upper and lower metal fittings and formed of an elastic material having rubber-like elasticity. Another one of the known vibration-isolating apparatus further comprises an insert metal fitting embedded in the vibration-isolating base body for improving rigidity in a direction perpendicular to an axial direction, in which axial direction the upper and lower metal fittings moves toward and away from each other, while maintaining the vibration-isolating function in the axial direction.

Various insert metal fittings have been proposed (for example, see JP-A-1998-047423(JP-A-10047423) or Japanese Patent Publication Unexamined No.10-47423(1998). Sizes of screw heads of the upper mounting bolts have been varied according to the magnitude of vibration which differs depending on the type of vehicle; or the screw heads have been fixedly secured on a tubular member by means of press-fitting, caulking or welding; to name a few.

Varying the shape of the screw heads requires a plurality of bolts to meet each specification. Thus, the handling of parts becomes cumbersome. On the other hand, fixedly securing of the bolt on the tubular member requires application of adhesive. also on inner surface of the tubular member prior to vulcanization, because the tubular member have to be adhered by the vulcanization to the vibration-isolating base body formed of the elastic material. However, since the tubular member is literally tubular in shape, it is difficult to coat the inner surface of the tubular member with the adhesive. Further, at the time of vulcanization, it is difficult to assure the inflow of injected rubber onto the inner circumferential surface of the tubular member. Accordingly, there arises a possibility of producing defective products.

BRIEF SUMMARY OF THE INVENTION

In view of the above, vigorous research has been made to obtain an insert metal fitting which enables a simple construction, lower manufacturing cost and a satisfactory state of adhesion after the vulcanization. As a result, we have found as follows. It is advantageous that the insert metal fitting is formed by bending a plate or sheet in an approximately U-shape so that the insert metal fitting opens in one direction among the directions perpendicular to an axial direction. By this formation, the application or spreading of an adhesive onto the inner surface of the metal fitting can be carried out easily. Moreover, rubber material which constitutes the vibration-isolating base body can be easily injected into the inside of the insert metal fitting, thus giving rise to the satisfactory state of adhesion after the vulcanization.

In short, a vibration-isolating apparatus according to the present invention comprises upper and lower metal fittings; a vibration-isolating base body connecting the upper and lower metal fittings and formed of an elastic material having rubber-like elasticity; and an insert metal fitting embedded in the vibration-isolating base body; the insert metal fitting being formed of a plate or sheet bent in an approximately U-shape and having an upper end portion thereof attached to the upper metal fitting.

In above, the insert metal fitting is attached to the lower surface of the upper metal fitting. In this case, the insert metal fitting having approximate U-shape may open either upwardly or downwardly. To be more specific, for example, the insert metal fitting of one aspect comprises: a pair of flat side-plate portions; and a connecting portion connecting the upper ends of the side-plate portions and having a through hole for a mounting bolt; the connecting portion being clamped between the upper metal fitting and a screw head of the mounting bolt which bolt is upwardly inserted into the through hole from vibration-isolating base-body side of the connecting portion.

On the other hand, for example, the insert metal fitting of another aspect comprises: a pair of flat side-plate portions; a connecting portion connecting the lower ends of the side-plate portions; and a flange portion formed on upper ends of the side-plate portions in such a manner as the upper ends are outwardly bent, the flange portions being fixedly secured to the lower surface of the upper metal fitting.

In both cases, the insert metal fitting laterally opens in one direction among the directions perpendicular to the axial direction. Thus, the coating of the inner surface of the insert metal fitting with an adhesive can be carried out easily; and the rubber material which constitutes the vibration-isolating base body can be easily injected into the space within the insert metal fitting. Further, the lateral direction to which the insert metal fitting opens perpendicularly to the axis can be freely set. The clamping position or the welding position of the insert metal fitting onto the upper metal fitting can be varied corresponding to the spring constant required in the direction perpendicular to the axis. Further, by changing the width of the plate or sheet or the length of the side-plate portions, a desired spring constant can be easily obtained. In addition to these advantages, in case of the insert metal fitting formed in an approximately U-shape which opens downwardly, the mounting thereof can be carried out more easily compared to cases where the insert metal fitting is welded, fixed by caulking or press-fitted onto the upper metal fitting.

Thickness of the plate or sheet for forming the insert metal fitting is not particularly limited and may be suitably selected corresponding to the required rigidity. For instance, by providing reinforcing ribs to the pair of side-plate portions, even the insert metal fitting formed of a thin plate or sheet has a required rigidity. The reinforcing ribs may be positioned on the side edges or on the central areas of the insert metal fitting.

As for injecting position or injecting direction of the rubber material with respect to the insert metal fitting, although they are not particularly limited, it is advantageous that the rubber injecting direction is set parallel to main surfaces of the side-plate portions of the insert metal fitting because the inflow of the injected rubber material is further facilitated. In particular, it is advantageous that a rubber injection port is disposed to correspond a space between a pair of side-plate portions with respect to a direction perpendicular to the side-plate portions, because the inflow of the rubber material into a space between a pair of side-plate portions is facilitated. Further, it is advantageous to form one or more holes in each of the side-plate portions or the connecting portion, because the flow of the rubber material is improved so that the integral formation between the insert metal fitting and the rubber member is further improved.

The insert metal fitting having the above-mentioned construction is applicable to various kinds of vibration-isolating apparatus. For example, the insert metal fitting is applicable to a liquid-filled vibration-isolating apparatus. This vibration-isolating apparatus further comprises a diaphragm associated with the lower metal fitting; a liquid chamber defined by the vibration-isolating base body and the diaphragm; a partition dividing the liquid chamber into a main liquid chamber and a sub liquid chamber; and an orifice formed in the partition and communicating the main liquid chamber with the sub liquid chamber.

DETAILED DESCRIPTION OF THE INVENTION

Several preferred embodiments of the vibration-isolating apparatus of the present invention are explained hereinafter in conjunction with attached drawings. The present invention, however, is not limited to these embodiments.

The First Embodiment

Figure 1:
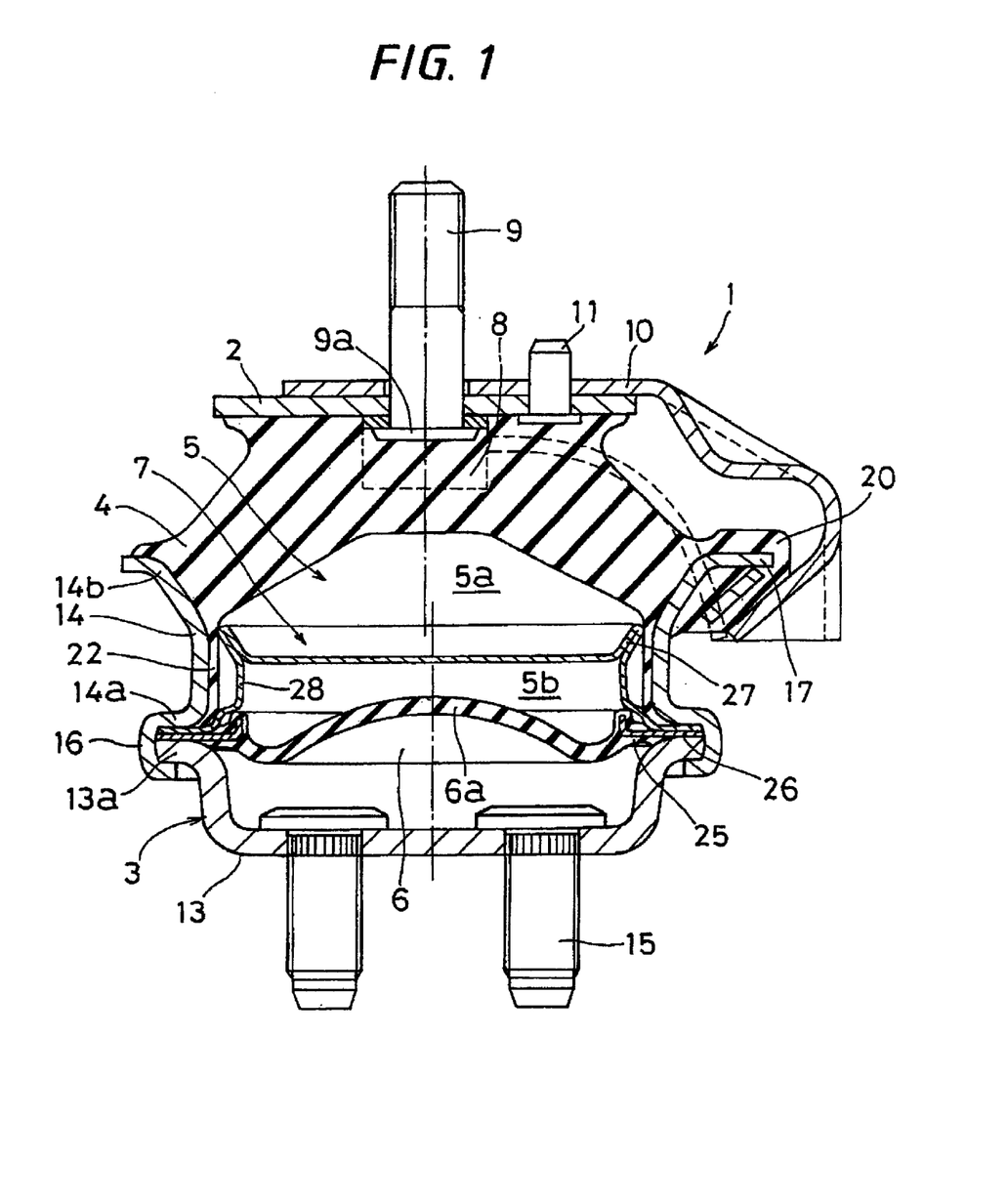
FIG. 1 is a cross sectional view of a liquid-filled vibration-isolating apparatus showing the first embodiment of the present invention.
Figure 2:
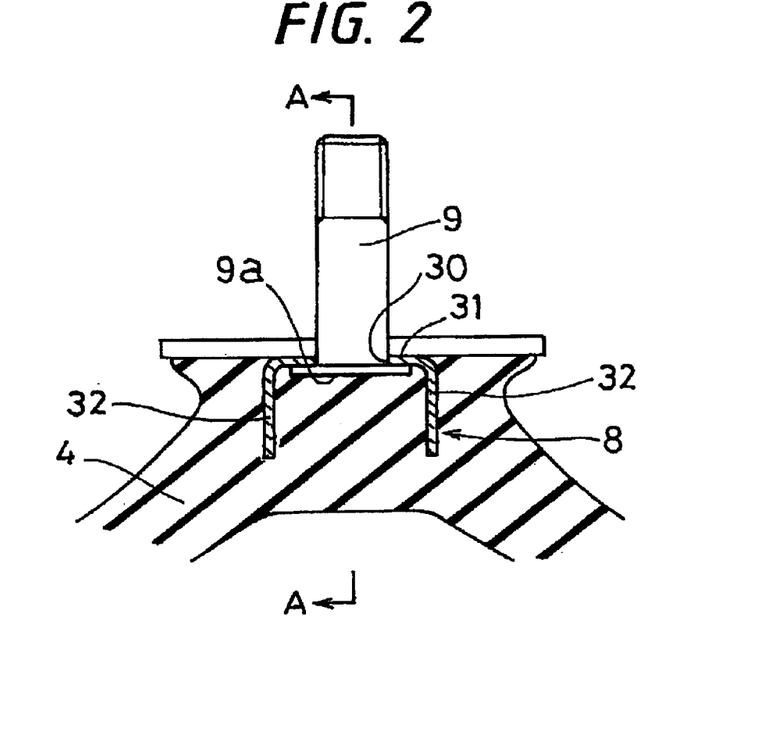
FIG. 2 is a cross-sectional view of an essential part of the liquid-filled vibration-isolating apparatus.
Figure 3:
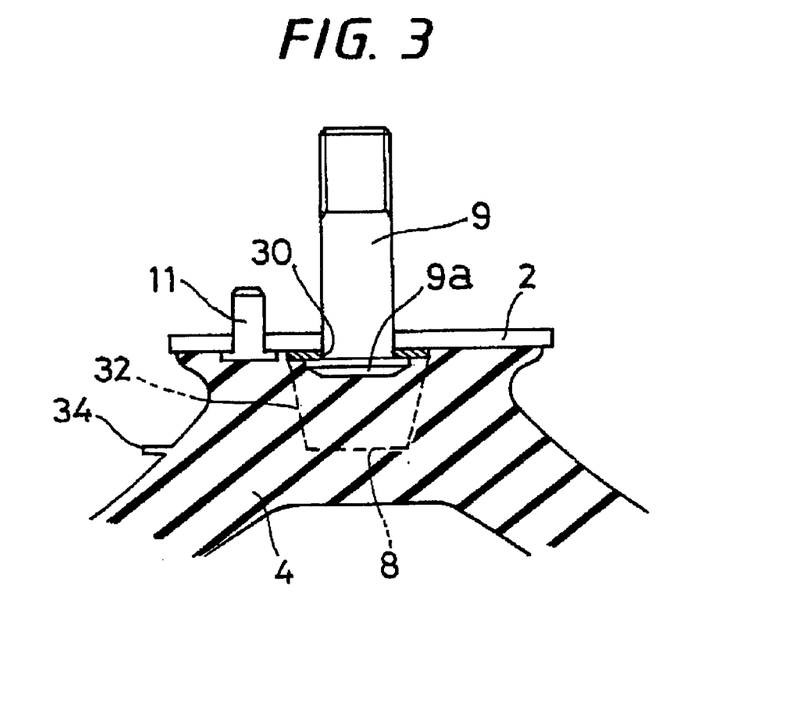
FIG. 3 is a cross sectional view taken along the line A—A of FIG. 2.

FIG. 1 is a cross sectional view of a liquid-filled vibration-isolating apparatus of the first embodiment of the present invention; FIG. 2 is a cross-sectional view of an essential part of the vibration-isolating apparatus; and FIG. 3 is a cross-sectional view of FIG. 2 taken along a line A—A.

As shown in the drawings, the liquid-filled vibration-isolating apparatus 1 is comprised of an upper metal fitting 2 which is mounted on a vibration-generating-body side such as on an engine side; a lower metal fitting 3 which is mounted on vehicle-body side; a vibration-isolating base body 4 formed of an elastic material having rubber-like elasticity which connects the upper an lower fittings 2, 3; a diaphragm 6 which is disposed in the lower metal fitting 3 such that it faces the vibration-isolating base body 4 in an opposed manner; a liquid chamber 5 defined by the diaphragm 6 and the vibration-isolating base body 4; and a partition 7 which divides the liquid chamber 5 into a main liquid chamber 5a and a sub liquid chamber 5b. An insert metal fitting 8 is embedded in the vibration-isolating base body 4 for increasing the rigidity of the vibration-isolating base body 4 in a direction perpendicular to the axial direction, along which axial direction the upper and lower metal fittings 2, 3 move toward and away from each other.

The upper metal fitting 2 is formed in a flat plate shape. A mounting bolt 9 which is protruded upwardly and supports the engine or the like passes through the central portion of the upper metal fitting 2 from lower side, that is, the vibration-isolating base body 4 side. A screw head 9a of the mounting bolt 9 prevents the removal or come-off of mounting bolt 9 from the upper metal fitting 2. Furthermore, for preventing an excess displacement, a stopper metal fitting 10 (a stabilizer metal fitting) having side-way fallen J-shaped cross section is disposed on the upper metal fitting 2. A proximal end section of the stopper metal fitting 10 is positioned and fixedly mounted on the upper surface of the upper metal fitting 2 by means of a small bolt 11, while a distal end of the stopper metal fitting 10 is outwardly extended in a lateral direction.

The lower metal fitting 3 is comprised of a bottomed barrel member 13 which has a radially extending outer flange 13a at the upper edge thereof and an central-trunk barrel member 14 which has a lower end thereof fastened to the outer flange 13a from the outside.

A plurality of mounting bolts 15 to be secured on a vehicle body or parts associated with the vehicle body are fixedly mounted on bottom portion of the bottomed barrel member 13. The lower edge of the central-trunk barrel member 14 is expanded radially to form a lower end flange 14a. The diaphragm 6 and a peripheral edge portion of the partition 7 are clamped between the lower end flange 14a and the outer flange 13a of the bottomed barrel member 13. The edge of the lower end flange 14a is extended to form a fastening portion 16 having an approximately laterally U-shaped cross section, which grasps the outer flange 13a from the outside and is fastened to the outer flange 13a by caulking.

The central-trunk barrel member 14 has an upper portion thereof expanded outwardly in a tapered shape to form an reversed-taper portion 14b. A portion of upper edge of the reversed-taper portion 14b is extended to form a flange 17, which faces a distal end of the stopper metal fitting 10. Onto inner surface of the reversed-taper portion 14b and around the flange 17 of the central-trunk barrel portion 14, the vibration-isolating base body 4 is adhered by vulcanization such that rubber material of the vibration-isolating base body 4 is extended to form a rubber portion 20 that encloses the flange 17.

The vibration-isolating base body 4 formed of the elastic material has a shape like an umbrella. The vibration-isolating base body 4 is a predominant or major rubber member among rubber members of the vibration-isolating apparatus. Upper and lower portions of the vibration-isolating base body 4 are respectively adhered by vulcanization to the upper metal fitting 2 and the central-trunk barrel member 14 of the lower metal fitting 3. The vibration-isolating base body 4 is extended to form a stopper portion 20 for preventing an excess displacement, in which stopper portion rubber material encloses the flange 17 of the central-trunk barrel member 14 and which faces the inner surface of the distal end of the stopper metal fitting 10.

The elastic material of the vibration-isolating base body 4 is extended downwardly as a thin film along inner-wall surface of the central-trunk barrel member 14 until it reaches the lower verge of the inner-wall surface of the central-trunk barrel member 14, to form a liquid-chamber rubber portion 22. The partition 7 is pressed into the central-trunk barrel member 14 along inward circumferential surface of the liquid-chamber rubber portion 22. An orifice 24 is formed as a space defined by the inward circumferential surface of the liquid-chamber rubber portion 22 and by the peripheral edge portion of the partition 7.

The diaphragm 6 comprised by a flexible film formed of an elastic material having a rubber-like elasticity; and an annular support metal fitting 25 whose inner edge is integrally embedded in the peripheral edge portion of the flexible film. The support metal fitting 25 is placed on the outer flange 13a of the bottomed barrel member 13. The liquid chamber 5 is defined by the diaphragm 6, a lower surface of the vibration-isolating base body 4 and the liquid-chamber rubber portion 22. The partition 7 is disposed in the liquid chamber 5 so as to divide the liquid chamber 5 into upper and lower chambers, that is, the main liquid chamber 5a and the sub liquid chamber 5b.

The partition 7 is formed by bending a single metal plate or sheet into an inverted bowl shape. A roof portion of the partition 7 is expanded outwardly to form an outward-extended portion that is to be brought into pressure contact with the inward circumferential surface of the liquid-chamber rubber portion 22. The lower edge portion of the partition member 7 is bent in a radially outward direction to form a flange portion 26. A circumferential edge of this flange portion 26 is fixedly secured to the fastening portion 16 of the lower metal fitting 3 by caulking. openings 27, 28 which respectively communicate with the main liquid chamber 5a and the sub liquid chamber 5b are formed in the upper surface and the side wall of the partition 7.

As shown in FIG. 2 and FIG. 3, the insert metal fitting 8 is formed by bending a single metal plate or sheet in an approximately U-shape which opens downwardly, that is, in an inverted U-shape having sharp corners. The insert metal fitting 8 is composed of a pair of flat side-plate portions 32 and a connecting portion 31 which connects upper ends of the side-plate portions 32. A through hole 30 for a mounting bolt is formed in the connecting portion 31. The connecting portion 31 is sandwiched or clamped between the lower surface of the upper metal fitting 2 and the screw head 9a of the mounting bolt 9, which bolt passes through the upper metal fitting 2 upwardly from lower side or the vibration-isolating base body 4 side. The direction to which the insert metal fitting 8 laterally opens, among directions perpendicular to the axis, is set as the direction toward and away from the stopper rubber 20. The stopper rubber 20 is formed of rubber that encloses the upper end flange 17 of the central-trunk barrel member 14.

The insert metal fitting 8 is assembled into the vibration-isolating apparatus in the following manner. As for mounting the mounting bolt 9 on the upper metal fitting 2, the upper end of the mounting bolt 9 is made to pass through the upper metal fitting 2 after being made to pass through a through hole 30 formed in the connecting portion 31 of the insert metal fitting 8. Then, the insert metal fitting 8 is installed such that it is clamped between the upper metal fitting 2 and the head 9a of the bolt 9. Subsequently, an adhesive is applied on surfaces to be joined with rubber material, of the central-trunk barrel member 14 and the upper metal fitting 2, and they are set in a vulcanizing mold (not shown in the drawings). The rubber material is filled in a space between the central-trunk barrel member 14 and the upper metal fitting 2. In this way, by vulcanization, the upper metal fitting 2 and the central-trunk barrel member 14 are adhered to each other while the insert metal fitting 8 is embedded in the vibration-isolating base body 4.

In respect of the step of coating with the adhesive for the vulcanization process, since the insert metal fitting 8 is formed in an approximately U-shape, the application of the adhesive to the inner surfaces of the side-plate portions 32 can be carried out easily.

In respect of injecting the rubber material, a rubber injection port 34 is preferably disposed at a place deviated from a space between the pair of flat side-plate portions 32 of the insert metal fitting 8, in a direction along main surfaces of the side-plate portions 32. This disposition of the injection port 34 further facilitates the injection of the rubber material into the space between the side-plate portions 32.

Figure 4:
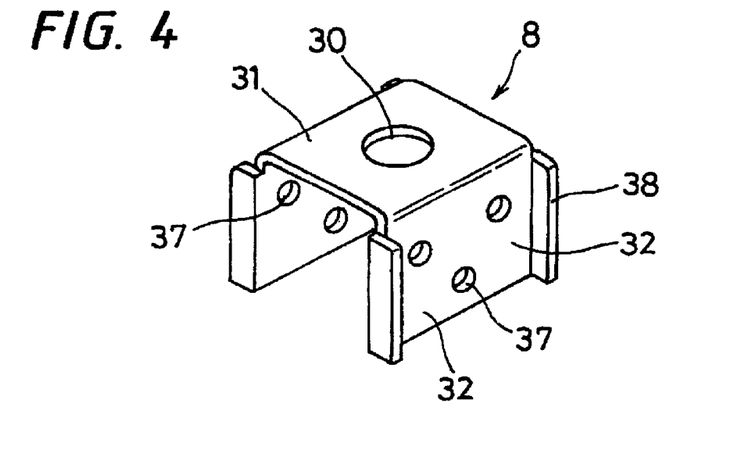
FIG. 4 is a perspective view showing an approximately U-shaped insert metal fitting which opens downwardly in another embodiment.

Whereas the insert metal fitting 8 shown in FIG. 2 and FIG. 3 is formed by simply bending a metal plate or sheet into an approximately U-shape, one or more holes 37 may be formed in the flat side-plate portions 32 as shown in FIG. 4 so as to facilitate flow of the rubber material. Thus, integral formation of the insert metal fitting and the rubber members is improved. Further, reinforcing ribs 38 may be formed along the side edges of the flat side-plate portions of the insert metal fitting 8 in a protruding manner, so as to enhance rigidity of the side-plate portions.

Figure 5A:
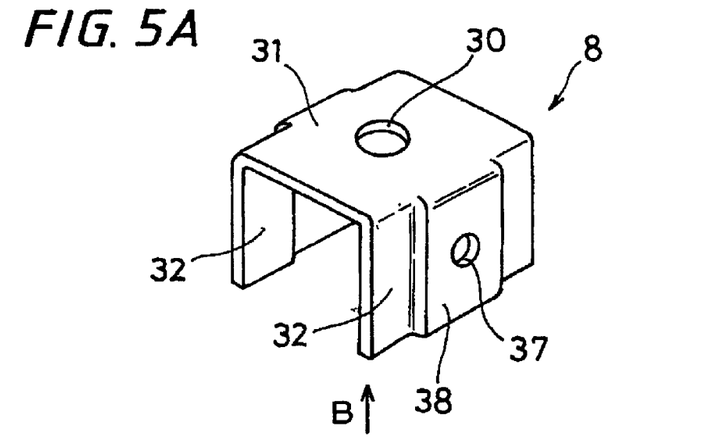
FIG. 5A is a perspective view showing an approximately U-shaped insert metal fitting in still another embodiment.
Figure 5B:
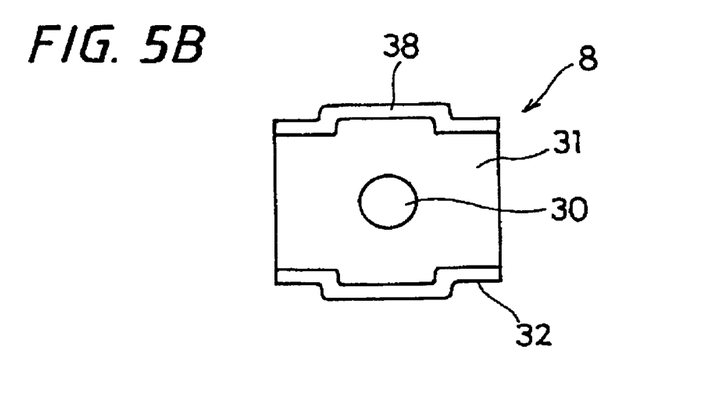
FIG. 5B is a view as seen in the direction of an arrow B in FIG. 5A.

FIG. 5A is a perspective view showing another modification of the approximately U-shaped insert metal fitting 8 which opens downwardly; and FIG. 5B is a view as seen in a direction of the arrow in FIG. 5A. In this modification, ribs 38 are formed at the central areas of each of the side-plate portions 32 of the insert metal fitting 8 by a press-working. Since other construction is as same as that of the embodiment shown in FIG. 4, the explanation thereof is omitted.

Second Embodiment

Figure 6:
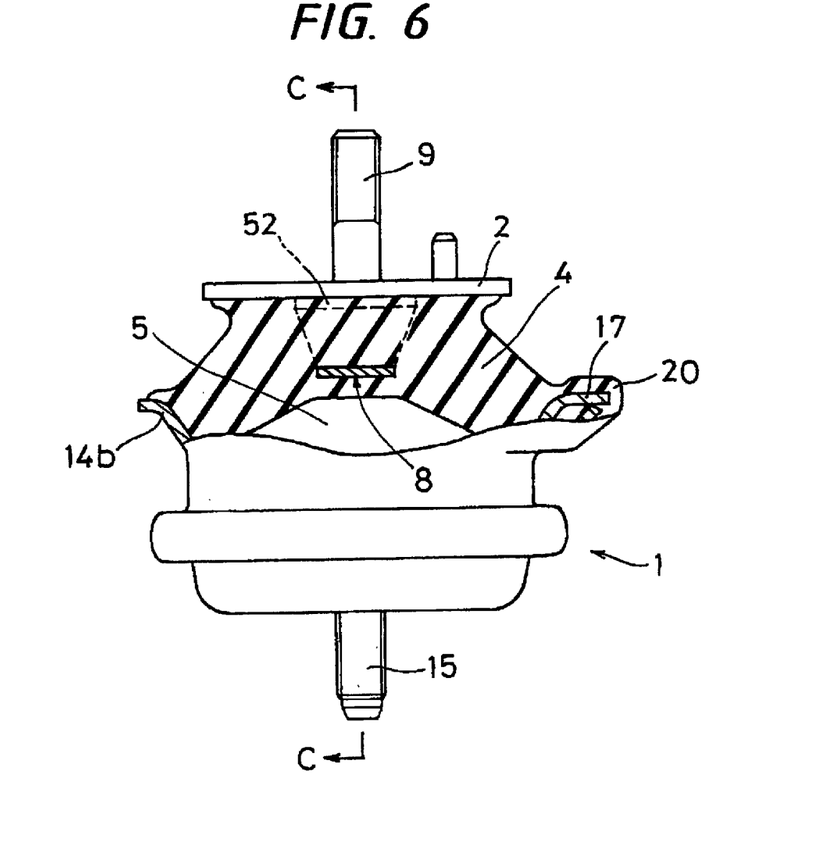
FIG. 6 is a cross-sectional view of a liquid-filled vibration-isolating apparatus of the second embodiment.
Figure 7:
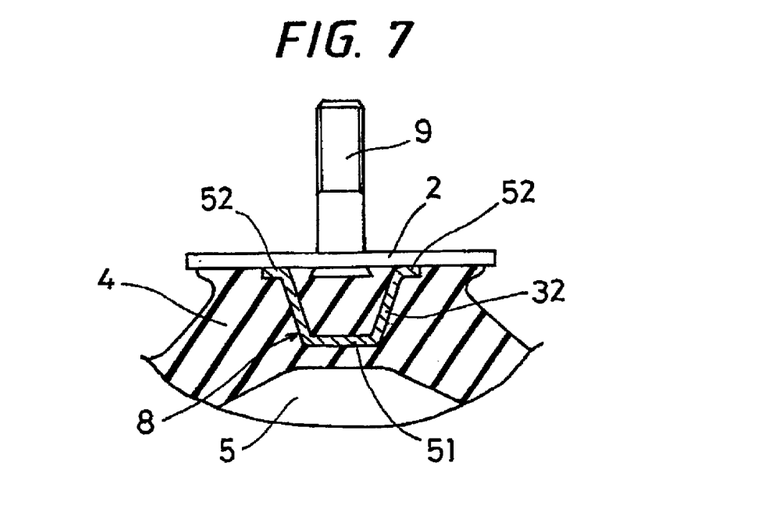
FIG. 7 is a partial cross-sectional view taken along the line C—C of FIG. 6.
Figure 8:
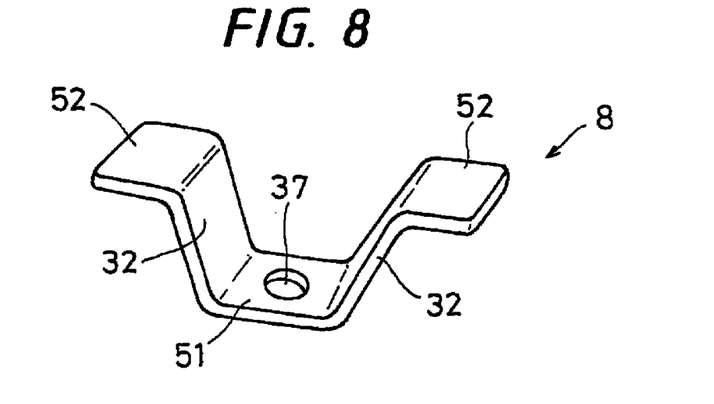
FIG. 8 is a perspective view of an insert metal fitting.

FIG. 6 is a cross-sectional view of a liquid-filled Vibration-isolating apparatus of the second embodiment. FIG. 7 is a cross-sectional view of FIG. 6 taken along the line C—C. FIG. 8 is a perspective view of an insert metal fitting. As shown in the drawings, in the liquid-filled vibration-isolating apparatus 1 of this embodiment, the insert metal fitting 8 is formed in a following manner. A metal plate or sheet is bent in an approximately U-shape to form a pair of flat side-plate portions 32 and a connecting portion 51 which connects lower end portions of the flat side-plate portions 32. Each upper part of respective flat side-plate portions 32 is bent outwardly to form a flange portion 52. These flange portions 52 are fixedly secured by welding to the lower surface of an upper metal fitting 2.

Both flat side-plate portions 32 inclines outwardly, that is, upper ends of the side-plate portions are positioned outward compared with respective lower end. Further, each of the flat side-plate portions 32 per se has an approximately trapezoidal shape where the lower-end side is narrower than the upper-end side in width or lateral dimension. The reason for adopting such a configuration is as follows. By this configuration, the flat side-plate portions 32 are arranged such that they are "quasi" parallel to a surface of the reversed-taper portion 14b of the central-trunk barrel member 14. Thus, local stress concentrations on the elastic material can be avoided at around the flat side-plate portions 32.

The direction the insert metal fitting 8 opens laterally or perpendicular-to-the-axis wisely is set, as in the case of the above-mentioned first embodiment, to the direction toward and away from the stopper rubber 20. In the stopper rubber 20, the rubber material encloses an upper end flange 17 of the central-trunk barrel member.

One or more through holes. 37 are formed in the center of the connecting portion 51 so that the discharge of liquid-form adhesive after coating with it is facilitated, thus facilitating the flow of the rubber material at the time of vulcanization molding. The other constructions are the same as that of the first embodiment and hence, the explanation thereof is omitted.

The above-described insert metal fitting 8 has an approximately U-shape which opens upwardly and in one direction perpendicular to the axis. For this reason, in the step of application of the adhesive when to conduct vulcanization, the application of the adhesive to the inner surfaces of the insert metal fitting 8 can be carried out easily. Further, as for injecting the rubber, a rubber-injection port 34 may be disposed at a position that is deviated in a direction along main surfaces of the side-plate portions 32 from a space between the side-plate portions 32. In this way, the injection of the rubber into a space between the flat side-plate portions 32 is further facilitated.

Moreover, one or more holes 37 may be formed on the flat side-plate portions 32 or the connecting portion 51, to improve the flow of the rubber material and to thereby improve integral formation of the insert metal fitting 8 and the rubber material. Further, reinforcing ribs 38 may be formed on the insert metal fitting 8 in a protruding manner, to further enhance rigidity of the insert metal fitting 8. Other operations are as same as those of the above-mentioned first embodiment, and the explanation thereof is omitted.

Figure 9A:
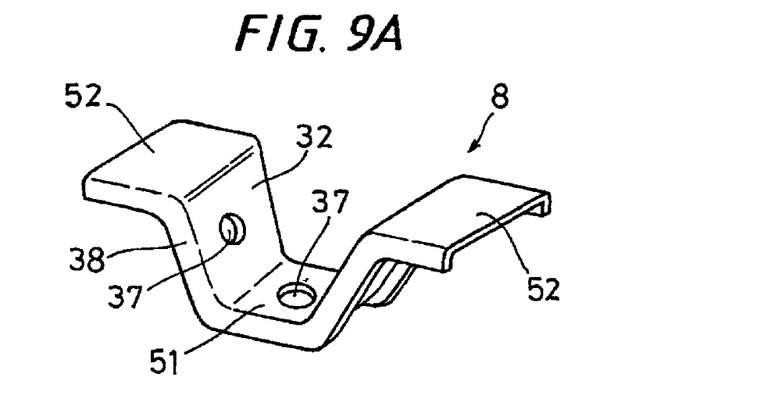
FIG. 9A is a perspective view of an approximately U-shaped insert metal fitting which opens upwardly in another embodiment.
Figure 9B:
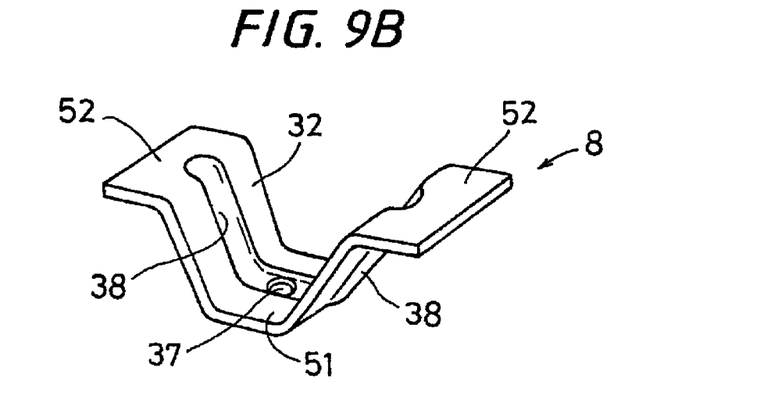
FIG. 9B is a perspective view of an approximately U-shaped insert metal fitting which opens upwardly in still another embodiment.

FIG. 9A and FIG. 9B respectively show modifications of approximately U-shaped insert metal fittings which open upwardly. FIG. 9A is a perspective view of the insert metal fitting 8, wherein through holes 37 for improving the flow of rubber material are formed also in the flat side-plate portions 32 while reinforcing ribs 38 are formed by bending, along side edges of each portion of the insert metal fitting 8. FIG. 9B shows an example where the reinforcing rib 38 is formed by outwardly bulging the middle of the widths of each portion of the insert metal fitting 8.

It is needless to say that the present invention is not limited to the above-mentioned embodiments and many modifications and alterations can be added within the scope of the present invention. For example, where as the insert metal fitting is formed from a metal plate or sheet in above, a sufficient rigidity may be secured by using rigid resin material for forming the insert metal fitting.

As has been explicitly described heretofore, according to the present invention, by forming the insert metal fitting in an approximately U-shape, the construction of the metal fitting becomes simplified so that the application of the adhesive to the inner surface of the metal fitting can be carried out easily and that the inflow of rubber material to the inside of the metal fitting is improved.

What is claimed is:

1. A vibration-isolating apparatus comprising
upper and lower metal fittings;
a vibration-isolating base body connecting the upper and lower metal fittings and formed of an elastic material; and
an insert metal fitting embedded in the vibration-isolating base body;
the insert metal fitting being formed of a metal plate or sheet bent in an approximately U-shape and including:
a pair of flat side-plate portions;
a connecting portion connecting the lower ends of the side-plate portions; and
a flange portion formed on upper ends of the side-plate portions in such a manner as the upper ends are outwardly bent, the flange portions being fixedly secured onto the lower surface of the upper metal fitting.

2. A vibration-isolating apparatus according to claim 1, wherein the insert metal fitting has a reinforcing rib or reinforcing ribs.

3. A vibration-isolating apparatus according to claim 1, wherein the insert metal fitting has one or more holes for inflow of rubber material.

4. A liquid-filled vibration-isolating apparatus according to claim 1, further comprising:
a diaphragm associated with the lower metal fitting;
a liquid chamber defined by the vibration-isolating base body and the diaphragm;
a partition dividing the liquid chamber into a first liquid chamber and a second liquid chamber; and
an orifice formed in the partition and communicating the first liquid chamber with the second liquid chamber.

5. A vibration-isolating apparatus comprising:
upper and lower metal fittings;
a vibration-isolating base body connecting the upper and lower metal fittings and formed of an elastic material; and
an insert metal fitting embedded in the vibration-isolating base body, the insert metal fitting having at least one reinforcing rib;
the insert metal fitting being formed of a metal plate or sheet bent in an approximately U-shape and having an upper end portion thereof attached to the upper metal fitting;
wherein the insert metal fitting has one or more holes for inflow of rubber material.

6. A vibration-isolating apparatus comprising:
upper and lower metal fittings;
a vibration-isolating base body connecting the upper and lower metal fittings and formed of an elastic material; and
an insert metal fitting embedded in the vibration-isolating base body, the insert metal fitting having at least one hole for inflow of rubber material;
the insert metal fitting being formed of a metal plate or sheet bent in an approximately U-shape and having an upper end portion thereof attached to the upper metal fitting.

7. A liquid-filled vibration-isolating apparatus according to claim 6, further comprising:
a diaphragm associated with the lower metal fitting;
a liquid chamber defied by the vibration-isolating base body and the diaphragm;
a partition dividing the liquid chamber into a first liquid chamber and a second liquid chamber; and
an orifice formed in the partition and communicating the first liquid chamber with the second liquid chamber.

8. A method for manufacturing a vibration-isolating apparatus comprising the steps of:
providing upper and lower metal fittings;
providing an insert metal fitting formed of a metal plate or sheet bent in an approximately U-shape and including:
a pair of flat side-plate portions; and a connecting portion connecting the upper ends of the side-plate portions and having a through hole for a mounting bolt;

the connecting portion being clamped between the upper metal fitting and a screw head of the mounting bolt which bolt is upwardly inserted into the through hole from vibration-isolating base-body side of the connecting portion; and injecting rubber material through a position that is deviated in a direction along main surfaces of the side-plate portions of the insert metal fitting from a space between the side-plate portions to form a vibration-isolating base body and adhere the isolation base body to the upper metal fitting and the lower metal fitting by vulcanization.

9. The method according to claim 8, wherein the insert metal fitting has a reinforcing rib or reinforcing ribs.

10. The method according to claim 9, wherein the insert metal fitting has one or more holes for inflow of rubber material.

11. The method according to claim 8, wherein the insert metal fitting has one or more holes for inflow of rubber material.

* * * * *